(12) United States Patent
Davis et al.

(10) Patent No.: US 8,490,177 B2
(45) Date of Patent: Jul. 16, 2013

(54) APPARATUS AND METHOD FOR VARIABLE AUTHENTICATION REQUIREMENTS

(75) Inventors: Mark Charles Davis, Durham, NC (US); Howard J. Locker, Cary, NC (US); Michael Thano Matthews, Cary, NC (US); Steven Richard Perrin, Raleigh, NC (US); Sean Michael Ulrich, Raleigh, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 148 days.

(21) Appl. No.: 13/048,766

(22) Filed: Mar. 15, 2011

(65) Prior Publication Data

US 2012/0239950 A1   Sep. 20, 2012

(51) Int. Cl.
*G06F 21/00* (2006.01)
*G06F 11/30* (2006.01)

(52) U.S. Cl.
USPC ........... 726/17; 726/4; 726/5; 726/27; 726/34

(58) Field of Classification Search
None
See application file for complete search history.

(56) References Cited

U.S. PATENT DOCUMENTS

| | | | |
|---|---|---|---|
| 5,812,859 A * | 9/1998 | Kamimaki et al. | 713/300 |
| 7,275,263 B2 * | 9/2007 | Bajikar et al. | 726/28 |
| 7,424,740 B2 * | 9/2008 | Bear et al. | 726/20 |
| 7,647,626 B2 * | 1/2010 | Bird et al. | 726/5 |
| 7,669,061 B2 * | 2/2010 | Curt et al. | 713/300 |
| 7,865,746 B2 * | 1/2011 | Bozek et al. | 713/310 |
| 8,001,404 B2 * | 8/2011 | Pathak | 713/320 |
| 8,073,142 B2 * | 12/2011 | Saga et al. | 380/200 |
| 8,245,026 B1 * | 8/2012 | Moore | 713/2 |
| 8,320,742 B2 * | 11/2012 | Park | 386/248 |
| 2001/0044894 A1 * | 11/2001 | Saito et al. | 713/156 |
| 2005/0144493 A1 * | 6/2005 | Cromer et al. | 713/310 |
| 2006/0161796 A1 * | 7/2006 | Cromer et al. | 713/323 |
| 2006/0282633 A1 * | 12/2006 | Iwai | 711/163 |
| 2007/0283445 A1 * | 12/2007 | Kaneko | 726/26 |
| 2009/0030970 A1 * | 1/2009 | Siegmund | 709/202 |
| 2009/0132839 A1 * | 5/2009 | Rothman et al. | 713/320 |
| 2009/0172443 A1 * | 7/2009 | Rothman et al. | 713/323 |
| 2010/0169631 A1 * | 7/2010 | Yao et al. | 713/2 |
| 2010/0169949 A1 * | 7/2010 | Rothman et al. | 726/1 |
| 2011/0102257 A1 * | 5/2011 | Spyropoulos et al. | 342/357.31 |
| 2011/0195699 A1 * | 8/2011 | Tadayon et al. | 455/418 |
| 2011/0252464 A1 * | 10/2011 | Sanjeev | 726/7 |
| 2012/0060030 A1 * | 3/2012 | Lamb | 713/166 |
| 2012/0060207 A1 * | 3/2012 | Mardikar et al. | 726/4 |
| 2012/0102313 A1 * | 4/2012 | Nicolson et al. | 713/2 |
| 2013/0042298 A1 * | 2/2013 | Plaza Fonseca et al. | 726/1 |

* cited by examiner

*Primary Examiner* — Christopher Revak
(74) *Attorney, Agent, or Firm* — Kunzler Law Group

(57) ABSTRACT

An apparatus and method are disclosed for variable authentication requirements. The apparatus includes an operating status module identifying a change in an operating status of a device and maintaining a history of operating statuses, and an access control module comparing a current operating status with a previous operating status. The apparatus also includes a profile module maintaining a trust indicator for each operating status. The access control module determines a level of authentication required to unlock the device in response to the trust indicator associated with the current operating status. The method includes identifying a change in an operating status of a device and maintaining a history of operating statuses, and comparing a current operating status with a previous operating status. The method also includes maintaining a trust indicator for each operating status, and determining a level of authentication required to unlock the device in response to the trust indicator associated with the current operating status.

20 Claims, 8 Drawing Sheets

APPARATUS AND METHOD FOR VARIABLE AUTHENTICATION REQUIREMENTS

TECHNICAL FIELD

The subject matter disclosed herein relates to user verification and more particularly relates to variable authentication requirements based on system state information.

BACKGROUND

DESCRIPTION OF THE RELATED ART

Users of electronic devices such as notebooks, and other portable or handheld computing devices all wish for a device with a longer battery life. However, battery technology does not advance as quickly as the technology behind the electronic devices. Stated differently, each generation of notebook, for example, includes faster, more powerful processors, but the battery technology powering these devices is generally the same as the previous generation of device. This results in a shorter battery life.

To combat this, manufacturers of electronic devices configure their devices to enter a low-power mode as often as possible. These low-power modes are often referred to as "sleep mode," "standby mode," "hibernate mode," etc. Essentially, the power management function of the device reduces or stops power supply to different components of the electronic device. These different components include the display, central processing unit, and storage device. Additionally, the power management function will stop the power supply to peripheral devices.

However, the power management function is not very convenient to the user. Because the device may be in a low power state and for a long time, the end user may not be present. So to maintain a security policy, typically when the device resumes from a low-power mode, the device requires some kind of user verification to resume operation. One form of user verification is a password. Constant entering of the password reduces usability, and is often seen as an annoyance by the user.

BRIEF SUMMARY

Based on the foregoing discussion, the inventors have recognized a need for an apparatus, and method that bypasses user verification based on system data. The embodiments of the present disclosure have been developed in response to the present state of the art, and in particular, in response to the problems and needs in the art that have not yet been fully solved by currently available user verification systems. Accordingly, the embodiments have been developed to provide a method and apparatus that overcome many or all of the above-discussed shortcomings in the art.

The apparatus is provided with a plurality of modules configured to functionally execute the necessary steps of variable authentication. These modules in the described embodiments include an operating status module identifying a change in an operating status of a device and maintaining a history of operating statuses, and an access control module comparing a current operating status with a previous operating status. The apparatus also includes a profile module maintaining a trust indicator for each operating status.

In one embodiment, the access control module determines a level of authentication required to unlock the device in response to the trust indicator associated with the current operating status. Furthermore, the access control module may unlock the device without requiring user authentication in response to the current operating status and a most recent operating status being the same, together with the trust indicator identifying the current operating status as trusted. In one example, the operating status is a power state of the device. Examples of power states include a sleep state, a hibernating state, a working state, and a powered off state.

In one example, the operating status is a location of the device. Examples of locations include geographic locations, and network locations. The apparatus may also include a location module identifying a current location of the device. The access control module may unlock the device without requiring user authentication in response to the current location and a most recent previously identified location being the same.

In a further embodiment, the operating status is an operating mode of the device. Examples of operating modes include a high-powered processor mode, a low-powered processor mode, a hardware machine mode, a virtual machine mode, and a remote machine mode. The access control module may unlock a current operating mode in response to a security status of a previous operating mode.

A method is also presented. The method may include identifying a change in an operating status of a device and maintaining a history of operating statuses, and comparing a current operating status with a previous operating status. The method, in one embodiment, also includes maintaining a trust indicator for each operating status, and determining a level of authentication required to unlock the device in response to the trust indicator associated with the current operating status.

In a further embodiment, the method includes unlocking the device without requiring user authentication in response to the current operating status and a most recent operating status being the same, together with the trust indicator identifying the current operating status as trusted. In yet another embodiment, the method includes identifying a current location of the device, unlocking the device without requiring user authentication in response to the current location and a most recent previously identified location being the same, and unlocking a current operating mode in response to a security status of a previous operating mode.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of the embodiments as set forth hereinafter.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
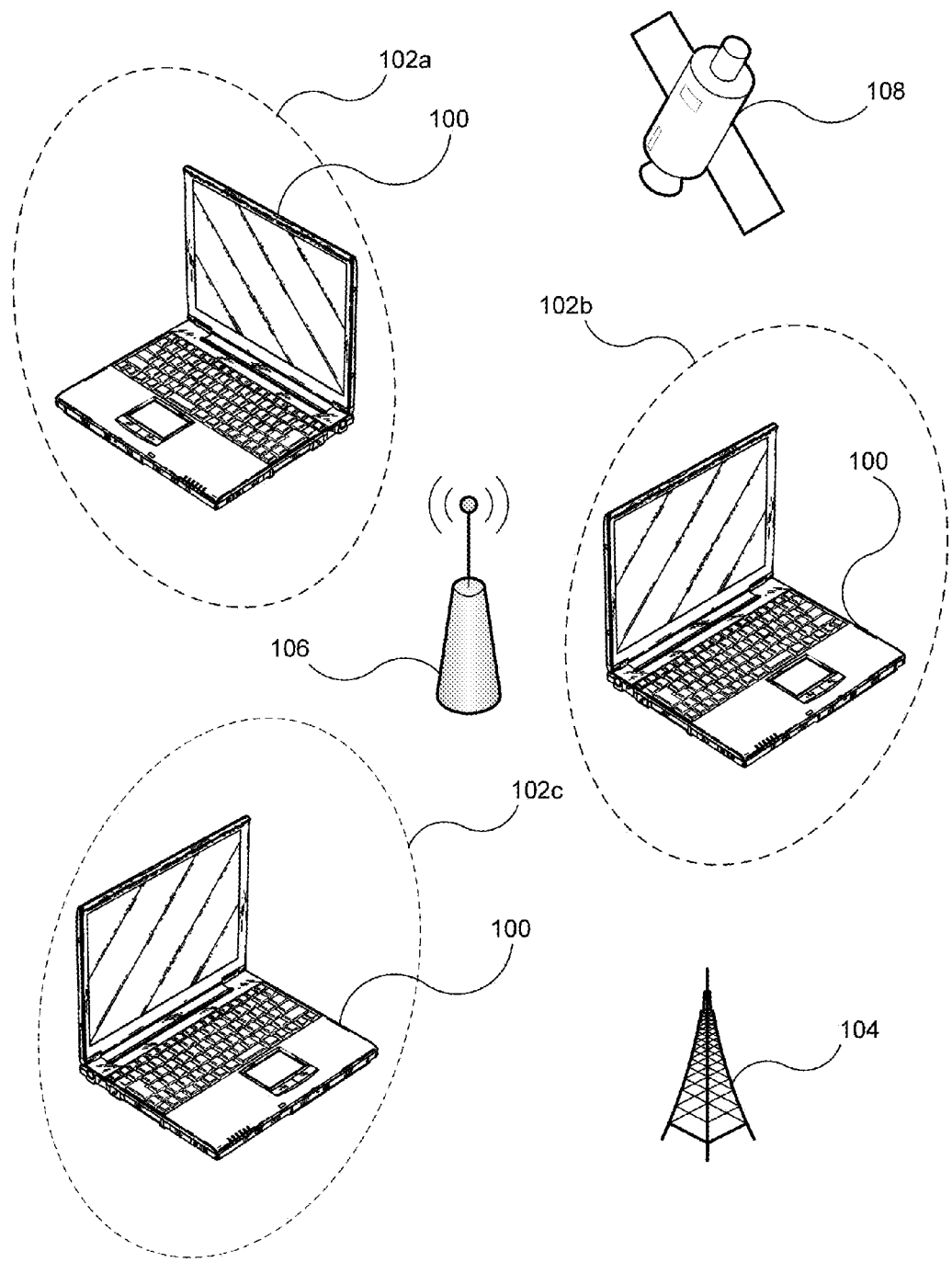
FIG. 1 is a schematic diagram illustrating one embodiment of an electronic device capable of operation in multiple locations.

As will be appreciated by one skilled in the art, aspects of the embodiments may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable medium(s).

Any combination of one or more computer readable medium(s) may be utilized. The computer readable medium may be a computer readable signal medium or a computer readable storage medium. The computer readable medium may be a tangible computer readable storage medium storing the computer readable code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Computer readable program code embodied on a computer readable medium may be transmitted using any appropriate medium, including but not limited to wireless, wireline, optical fiber cable, RF, etc., or any suitable combination of the foregoing.

Computer readable program code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1 is a schematic diagram illustrating one embodiment of an electronic device 100 capable of operation in multiple locations. In one embodiment, the electronic device (hereinafter "device") 100 is a portable computing device such as a notebook. Other examples of a device 100 capable of operation in multiple locations include, but are not limited to, cellular phones, tablet computers, desktop computers, and handheld gaming devices. Stated differently, the device 100 is representative of any device having a central processing unit.

The device 100, as depicted, is capable of use in multiple locations (referred to collectively as "locations 102," and separately as location 102a, 102b, or 102c). Locations 102 may represent distinct geographical locations including, but not limited to, an office, a coffee shop, a park, a home, etc. In other words, a location refers to any place where the device 100 may be used. Alternatively, a location may refer to a network, or segment of a network. For example, a first location may be a cellular data network 104 connected to the device 100 and a second location may be a wireless local area network 106. In a further embodiment, and as will be discussed in greater detail below, the networks may be used to identify the physical location of the device 100.

The device 100, as is known to those of skill in the art, is capable of continuous use from a first location 102a to a second location 102b. Also known to those of skill in the art, the device 100 may be powered off or put into a sleep mode while being transported from the first location 102a to the second location 102b, or third location 102c. Although FIG. 1 depicts three distinct locations 102a, 102b, 102c, it should be understood that the device 100 may be used in any number of different locations.

In one embodiment, the device 100 is capable of communicating with one or more networks as described above. These networks include, but are not limited to, local area networks, wireless local area networks, wide area networks (wired and wireless), etc. The physical location of the device 100 may be identified using these networks through methods known to those of skill in the art. Briefly, these methods include triangulation using GPS signals from satellites 108, positioning using cell tower 104 information, positioning using wireless local area network information 106, and positioning using internet protocol (IP) geolocation. In other words, any method of locating the device 100 is capable of use within the scope of the present disclosure.

Figure 2:
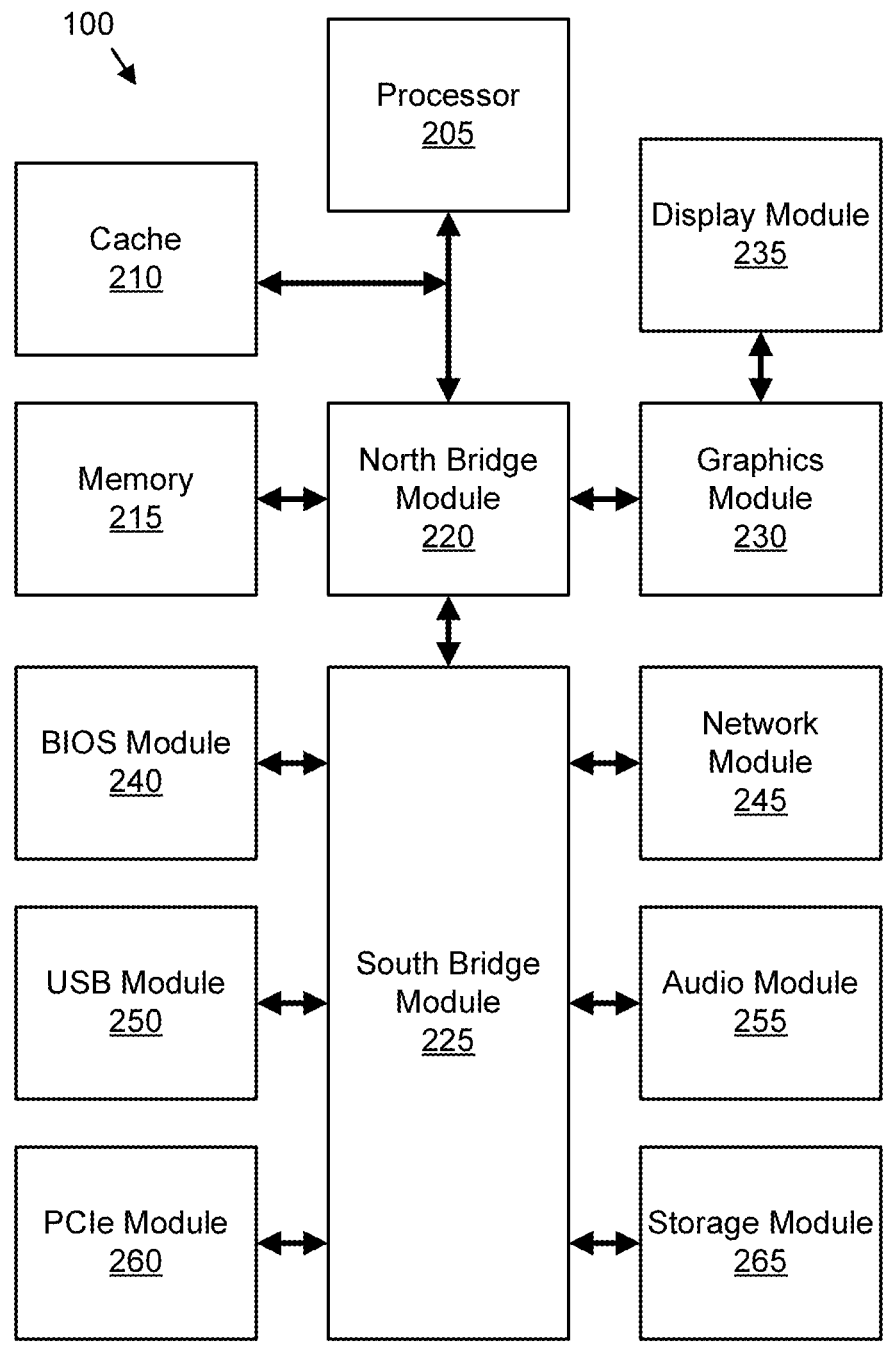
FIG. 2 is a schematic block diagram illustrating another embodiment of a device.

FIG. 2 is a schematic block diagram illustrating one embodiment of a device 100 as described above with reference to FIG. 1. In the depicted embodiment, the device 100 is a computer. The device 100 includes a processor 205, a cache 210, a memory 215, a north bridge module 220, a south bridge module 225, a graphics module 230, a display module 235, a basic input/output system (BIOS) module 240, a network module 245, a USB module 250, an audio module 255, a computer bus module 260 (such as a peripheral component interconnect express (PCIe)), and a storage module 265.

The processor 205, cache 210, memory 215, north bridge module 220, south bridge module 225, graphics module 230, display module 235, BIOS module 240, network module 245, USB module 250, audio module 255, PCI module 260, and storage module 265, referred to herein as components, may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The processor 205 executes processor-readable programs as is well known to those skilled in the art. Although depicted as a single processor, the device may include multiple processors. For example, the device may include a high power processor, and a low power processor. The high power processor is useful for processor intensive applications, while the low power processor may be used for less intensive applications, such as reading email, etc. An operating system may switch between using the high and low powered processors to save battery life. In yet another embodiment, the different processors may be utilized by different operating systems, or operating modes.

The processor-readable programs may be tangibly stored in the memory 215. The processor-readable programs may also be tangibly stored in the storage module 265. The storage module 265 may be a hard disk drive, an optical storage device, a holographic storage device, a micromechanical storage device, a semiconductor storage device, or the like.

The processor 205 may communicate with the cache 210 through a processor interface bus to reduce the average time to access the memory 215. The cache 210 may store copies of the data from the most frequently used memory 215 locations.

The north bridge module 220 may communicate with and provide bridging functionality between the processor 205, the graphic module 230, the memory 215, and the cache 210. The processor 205 may be connected to the north bridge module 220 over a front side bus.

The north bridge module 220 may be connected to the south bridge module 225 through a direct media interface (DMI) bus. The DMI bus may provide a high-speed, bi-directional, point-to-point link supporting a clock rate for example of one Gigabytes per second (GBps) in each direction between the north bridge module 220 and the south bridge module 225. The south bridge module 225 may support and communicate with the BIOS module 240, the network module 245, the PCI module 260, and the storage module 265.

The PCI module 260 may communicate with the south bridge module 225 for transferring data or power to peripheral devices. The PCI module 260 may include a PCI bus for attaching the peripheral devices. The PCI bus can logically connect several peripheral devices over the same set of connections. The peripherals may be selected from a printer, a joystick, a scanner, or the like. The PCI module 260 may also comprise an expansion card as is well known to those skilled in the art.

The BIOS module 240 may communicate instructions through the south bridge module 225 to boot the electronic device 110, so that processor readable programs stored on the storage module 265 can load, execute, and assume control of the electronic device 110. Alternatively, the BIOS module 240 may comprise a coded program embedded on a chipset that recognizes and controls various devices that make up the electronic device 110.

The network module 245 may communicate with the south bridge module 225 to allow the electronic device 110 to communicate with other devices over a network such as the networks described above with reference to FIG. 1. The devices may include routers, gateways, servers, printers, and the like.

The display module 235 may communicate with the graphic module 230 to display information. The display module 235 may be a cathode ray tube (CRT), a liquid crystal display (LCD) monitor, electronic ink, or the like. The USB module 250 may communicate with one or more USB compatible devices such as a portable storage device over a USB bus. The audio module 255 may generate an audio output. The above described components function together and communicate with an operating system to provide a platform upon which applications and modules may run.

Figure 3:
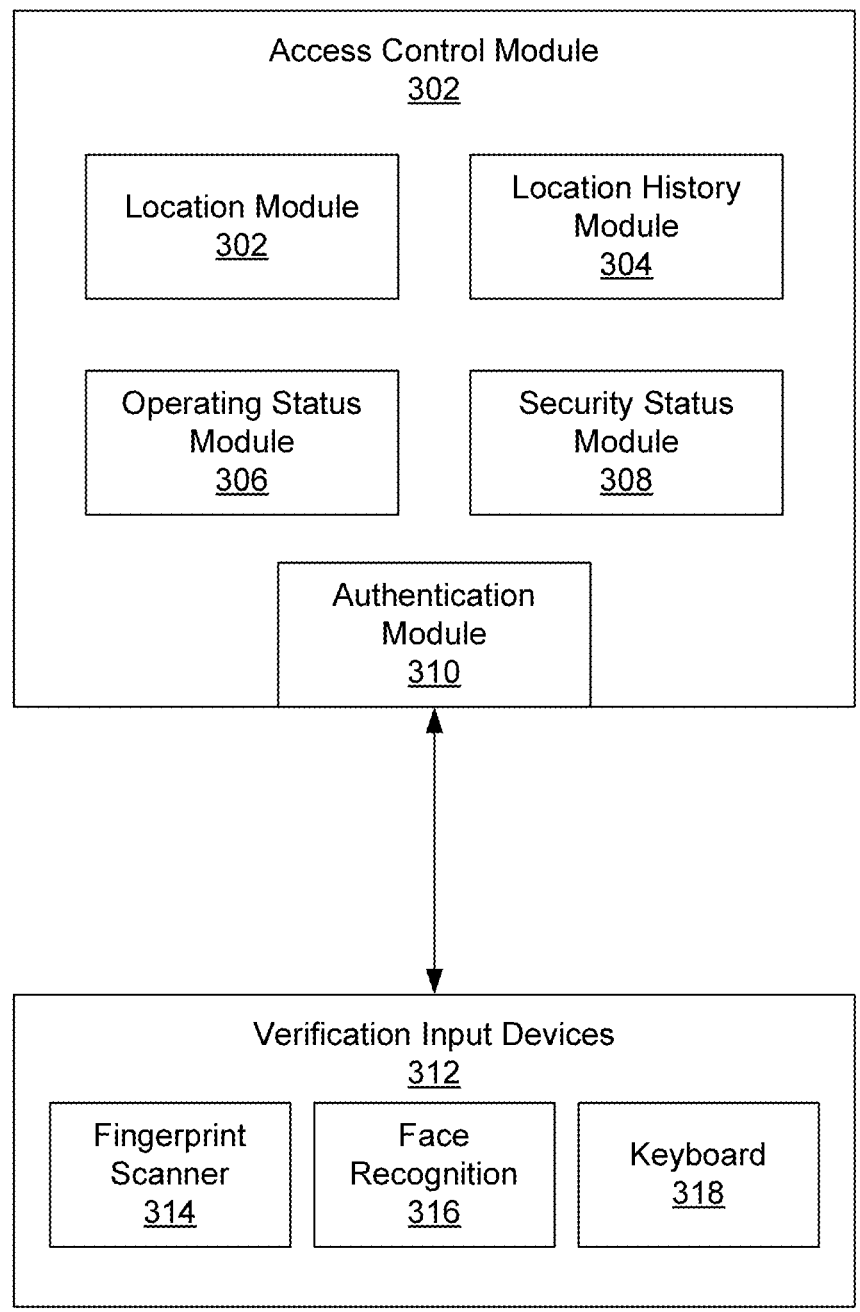
FIG. 3 is a schematic block diagram illustrating one embodiment of an access control module.

FIG. 3 is a schematic block diagram illustrating one embodiment of an access control module 300. The access control module 300, in one embodiment, is configured to authenticate a user based on the location of the device 100, the security status of the device 100, and the power status of the device. As used herein, the term "operating status" refers to at least one of the location status, the security status, and the power status and may refer to a combination of all three. For example, and as will be described below, the operating status may refer to both the location of the device, whether it was locked or unlocked, and in which power state the device was in.

The access control module 300 includes a location module 302, a location history module 304, an operating status module 306, a security status module 308, and an authentication module 310. The location module 302 is configured to identify the location of the device 100 of FIG. 1. As briefly described above, the location module 302 may identify either the geographic location of the device or the network location of the device. Stated differently, the location module 302 identifies whether the device 100 is at the home of a user, the office of the user, park, coffee shop, etc. Furthermore, the location module 302 identifies to which network the device 100 is connected and whether that network is a local area network (wired or wireless), or a cellular data network, for example.

The location module 302 may use any of the above described methods to identify the location of the device 100. These methods include, briefly, GPS triangulation, WiFi and/or cellular tower positioning, and IP geolocation, or any combination thereof. The location module 302 communicates the location information with the location history module 304.

In one embodiment, the location history module 304 maintains a history of locations. This history may include only the current location and the most recent previous location. Alternatively, the history may include a pre-determined number of previous locations. The location history module 304 maintains this history in persistent memory such as the storage module 265 of FIG. 2. As will be described below in greater detail, the access control module 300 uses the current and previous location information in determining whether to grant access to the device 100 without requiring user authentication.

The operating status module 306 identifies operating mode transitions in the operating state of the device 100. Changes or transitions in the operating state of the device 100 may include, but are not limited to, "wake events," and "sleep events." A "wake event," as used herein, refers to a transition from either a sleeping or hibernating state to a working state. A wake event may be caused by a scheduled timer or a device event such as a key or button press. A "sleep event," as used herein, is a transition from the working state to a sleeping, hibernating, or powered off state.

The operating status module 306, in another embodiment, is configured to detect other changes in operating status. Other changes include switching from a high-power mode to a low-power mode which may involve switching from a high-powered processor to a low-powered processor. Examples of other operating status changes include, but are not limited to, switching from a first operating system to a second operating system, switching to a virtual machine operating within the first or second operating system, and switching to a remote viewing client (or remote desktop client).

In a further embodiment the operating status module 306 identifies the network status of the device 100. For example, the operating status module 306 will record "hardware events" including active/inactive network link states, power state (running on battery), and the type and number of attached devices. Maintaining such information provides the access control module 302 with another factor in determining the location of the device 100. For example, if the device 100 had multiple attached devices (such as a keyboard and mouse) prior to entering a sleep state, and upon waking the attached devices are no longer attached, the access control module 302 may be configured to consider this as evidence that the device 100 has been moved to a new location.

Other factors used in making the determination to require authentication include the security status of the device 100. In other words, whether the device 100 was in a locked or unlocked state when in the previous location. The security status module 308 maintains the current security status of the device 100. In one embodiment, the status of the device 100 is either "locked" or "unlocked." Alternatively, the security states of the computer may include different As used herein, a "locked" state refers to an electronic device that requires some type of user authentication prior to use by a user. Similarly, an "unlocked" state refers to an electronic device that does not require some type of user authentication. One example of a "locked" device is a computer that requires a username and password before allowing a user to login.

The authentication module 310 is configured to interface with verification input devices 312. Verification input devices 312 include, but are not limited to, a fingerprint scanner 314, a face recognition camera 316, and a keyboard 318 for receiving a password. Other biometric devices that uniquely identify a user based upon one or more intrinsic physical or behavioral traits may be used with the present disclosure. Examples of other biometric devices could include devices capable of identifying a user based on palm prints, hand geometry, iris recognition, odor, typing rhythm, voice, etc.

In a further embodiment, the access control module 300 is configured to communicate a requirement with the authentication module 310 to require a combination of the above mentioned verification methods. For example, the authentication module 310 may be configured to require that a user input a password via the keyboard 318 and swipe a finger across the fingerprint scanner 314. This enhanced security requirement may be based on the location module 302 identifying the location of the device as "unknown." This will be discussed in greater detail below with reference to FIG. 8.

Figure 4:
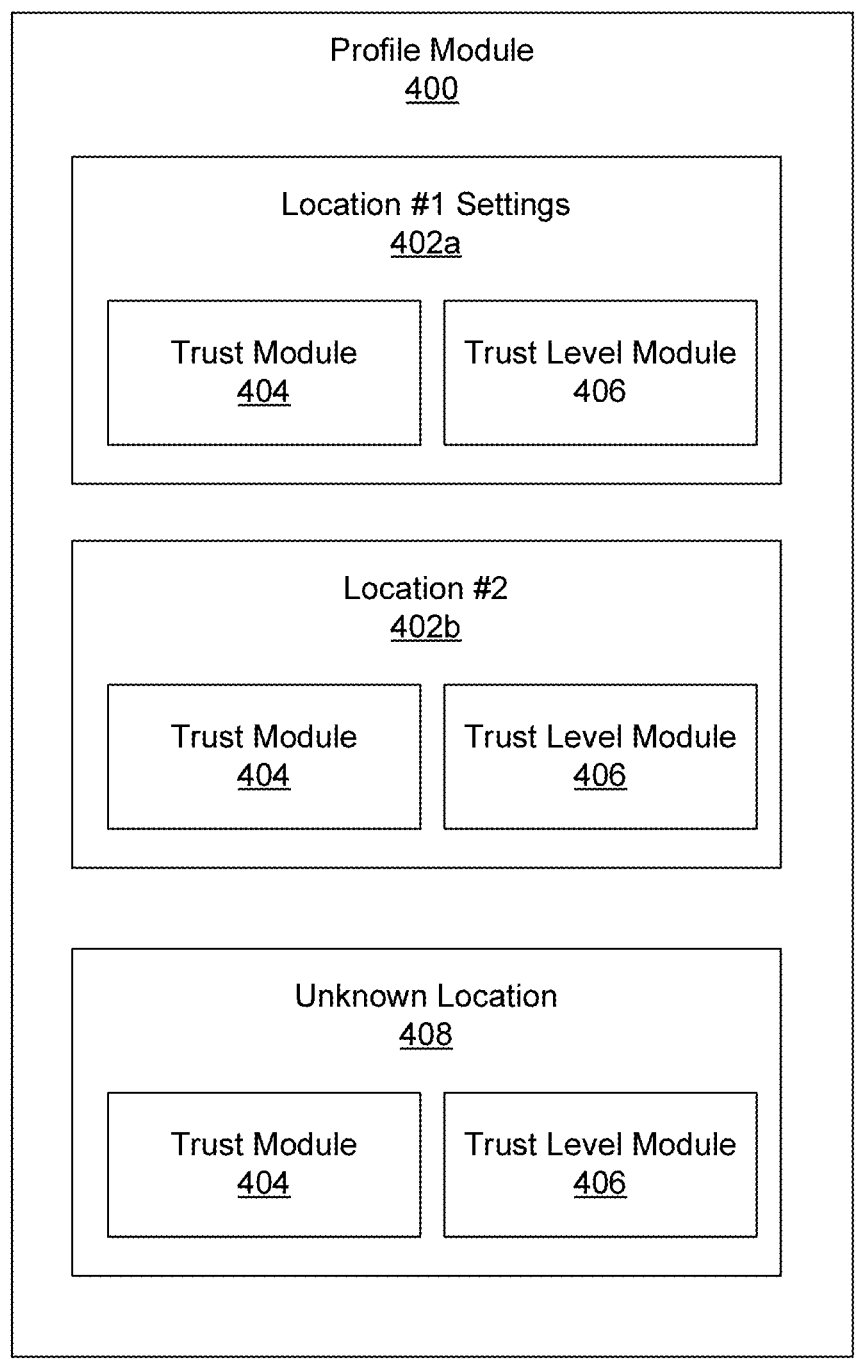
FIG. 4 is a schematic block diagram illustrating one embodiment of a profile module.

FIG. 4 is a schematic block diagram illustrating one embodiment of a profile module 400. The profile module 400 maintains, in one example, a list of location settings 402a, 402b. The list of location settings 402a, 402b correspond to the various locations a user may take the device 100. Each location setting 402a, 402b includes a trust module 404 and a trust level module 406. The depicted profile module 400 illustrates three distinct location settings 402a, 402b, 408, however, the profile module 400 is capable of maintaining the location settings of any number of locations.

The trust module 404 identifies a location as either "trusted" or "not trusted." As used herein, a "trusted location" refers to a location that is both known and trusted by the user. For example, a "trusted location" would be the home of the user, and perhaps the office of the user. A "not trusted" location might include a different floor of the workplace building of the user where the device 100 is not normally used. Stated differently, a "not trusted" location is any location to which the device 100 might be taken if stolen.

The trust level module 406 maintains a trust level for a specific location. Certain locations may require, as determined automatically or by the user, different levels of authentication. For example, a user might determine that if the device is located at work, the trust level module 406 should require that the user only input a password. Alternatively, if the device 100 is located at an unknown location 408, the trust level module 406 should require both a password and a fingerprint scan.

Figure 5:
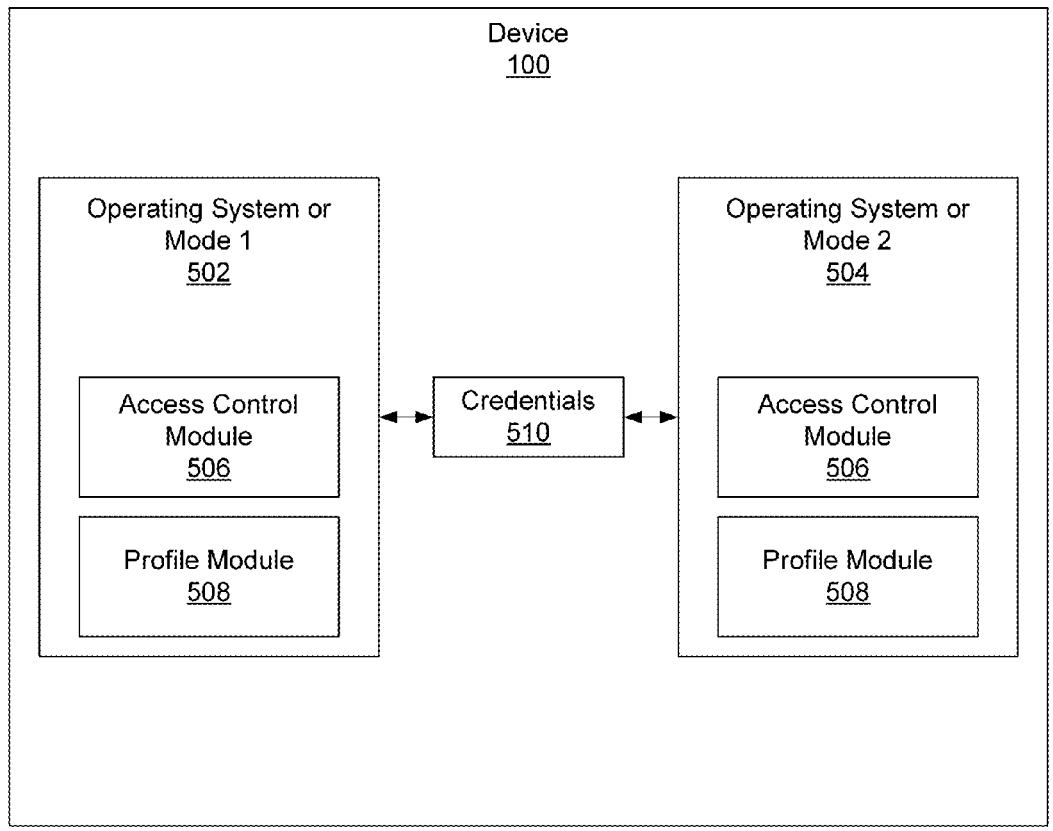
FIG. 5 is a schematic block diagram illustrating another embodiment of the device.

FIG. 5 is a schematic block diagram illustrating another embodiment of the device 100. The device 100 is capable of multiple operating modes. The multiple operating modes include multiple operating systems, or virtual machines as described above. The device 100 includes a first operating system or mode 502, and at least a second operating system or mode 504. Examples of the different operating modes include parallel operating systems (i.e., dual boot configurations), high and low-powered operating modes, virtual machines, and remote viewing modes.

Each operating mode 502, 504 includes an access control module 506 and a profile module 508. The access control module 506 and profile module 508 of FIG. 5 are equivalent to the access control module and profile module of FIGS. 3 and 4, respectively. In the depicted embodiment, the access control module 506 of the first operating mode 502 is configured to communicate with the access control module 506 of the second operating mode 504. In particular, the access control modules 506 communicate security credentials 510 that allow a user to bypass a requirement to input a password, for example.

Figure 6:
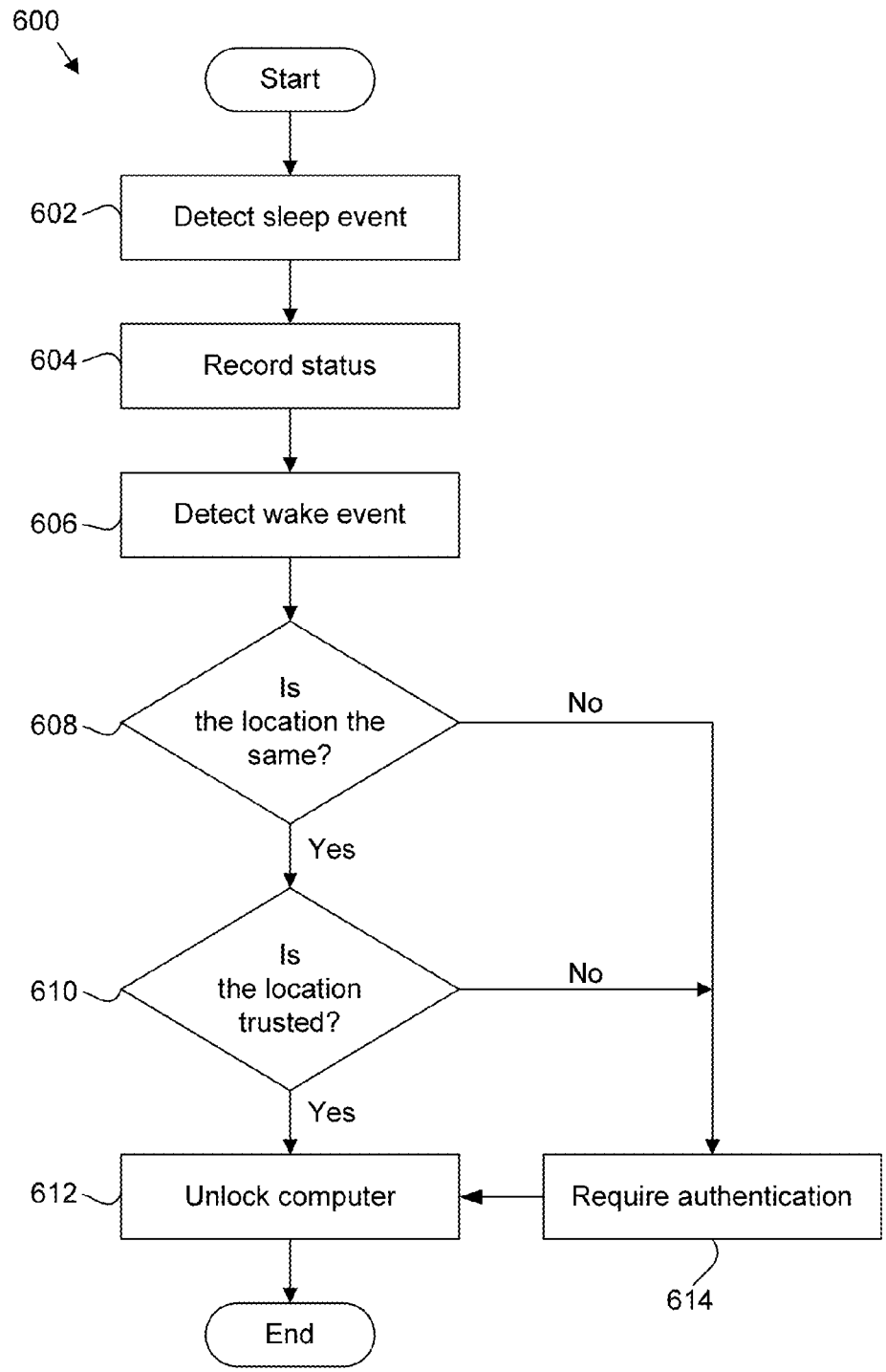
FIG. 6 is a schematic flow chart diagram illustrating one embodiment of a method for location based authentication.

FIG. 6 is a schematic flow chart diagram illustrating one embodiment of a method 600 for location based authentication. The method 600 starts and the operating status module 305 of FIG. 3 detects 602 a sleep event. In one embodiment, detecting 602 a sleep event includes detecting an operating status change from a working state to a sleeping, hibernating, or equivalent low-powered state.

The security status module 308, of FIG. 3, then records 604 the security status of the device. In other words, the security status module 308 records whether the device was in a locked or an unlocked state at the moment the device began to transition to a sleep state. Simultaneously, the location module 302 records 604 the location of the device and the location history module 304 records the location. In one embodiment, the location module 302 uses any of the above described locating methods to determine the location of the device. These methods may include gps locating, cell tower positioning, WiFi positioning, IP geolocation, etc.

The operating status module 306 also records 604 various system state data as described above with reference to FIG. 3. System state data includes, but is not limited to, network link status, power state, identification of attached devices, etc. The access control module may make a determination based on the system state data together with the location data and the security status, as will be described below. Alternatively, the access control module may make the determination based only on the location and the security state.

The operating status module 306 then detects a wake event 606. Or, stated differently, the user wakes the device by, for example, opening the lid of a notebook, pressing a power button, etc. The access control module 300 then determines if the location when the device wakes is the same 608 as when the device went to sleep by comparing the current location with the most recent location stored in the location history module 304.

If the location is the same 608, the access control module 300 then determines 610 if the location is trusted. In one embodiment, the access control module determines 610 if the location is trusted by communicating with the profile module 400 of FIG. 4 and retrieving the location settings 402 of the current location. If the location is trusted, the access control module 300 unlocks the device without authentication input from the user.

However, if the location is different 608, or the location is not trusted 610, then the access control module 300 requires 614 authentication input from the user. Authentication input from the user, in one embodiment, may include one or more of inputting a password, swiping a fingerprint, or identifying the user based on other biometric information as described above.

Figure 7:
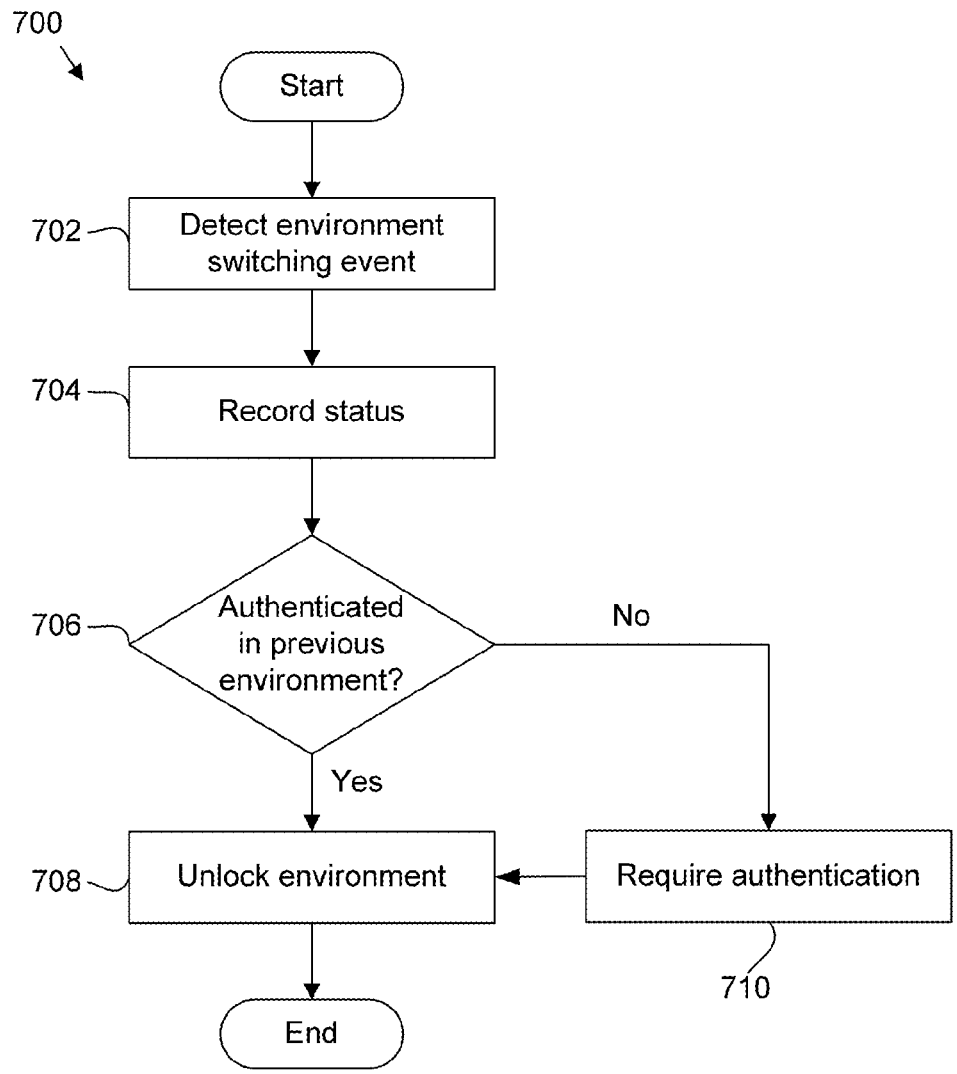
FIG. 7 is a schematic flow chart diagram illustrating one embodiment of a method for user authentication across different operating modes.

FIG. 7 is a schematic flow chart diagram illustrating one embodiment of a method 700 for user authentication across different operating modes. In one embodiment, the method 700 starts and the operating status module 306 detects 702 an environment switching event. As used herein, the term "environment switching" refers to a change of operating mode or system. Examples include switching from one operating system to a second operating system, switching between a high-powered mode to a low-powered mode (which may be associated with a high and low-powered processor), switching to a virtual machine within an operating system, switching to a remote machine, etc.

Upon detecting such an event, the security status module 308 records the current security status. Recording 704 the current security status, in one embodiment, includes recording whether the device is in a locked or an unlocked state. The access control module determines 706 whether the device was previously in a locked or unlocked state prior to the switching event, and if yes, the access control module 300 unlocks 708 the current environment. In one embodiment, unlocking 708 the current environment includes communicating security credentials from one access control module to an access control module of the new environment. If the security status, however, was "locked," then the access control module requires 710 authentication prior to unlocking 708 the environment or operating mode.

Figure 8:
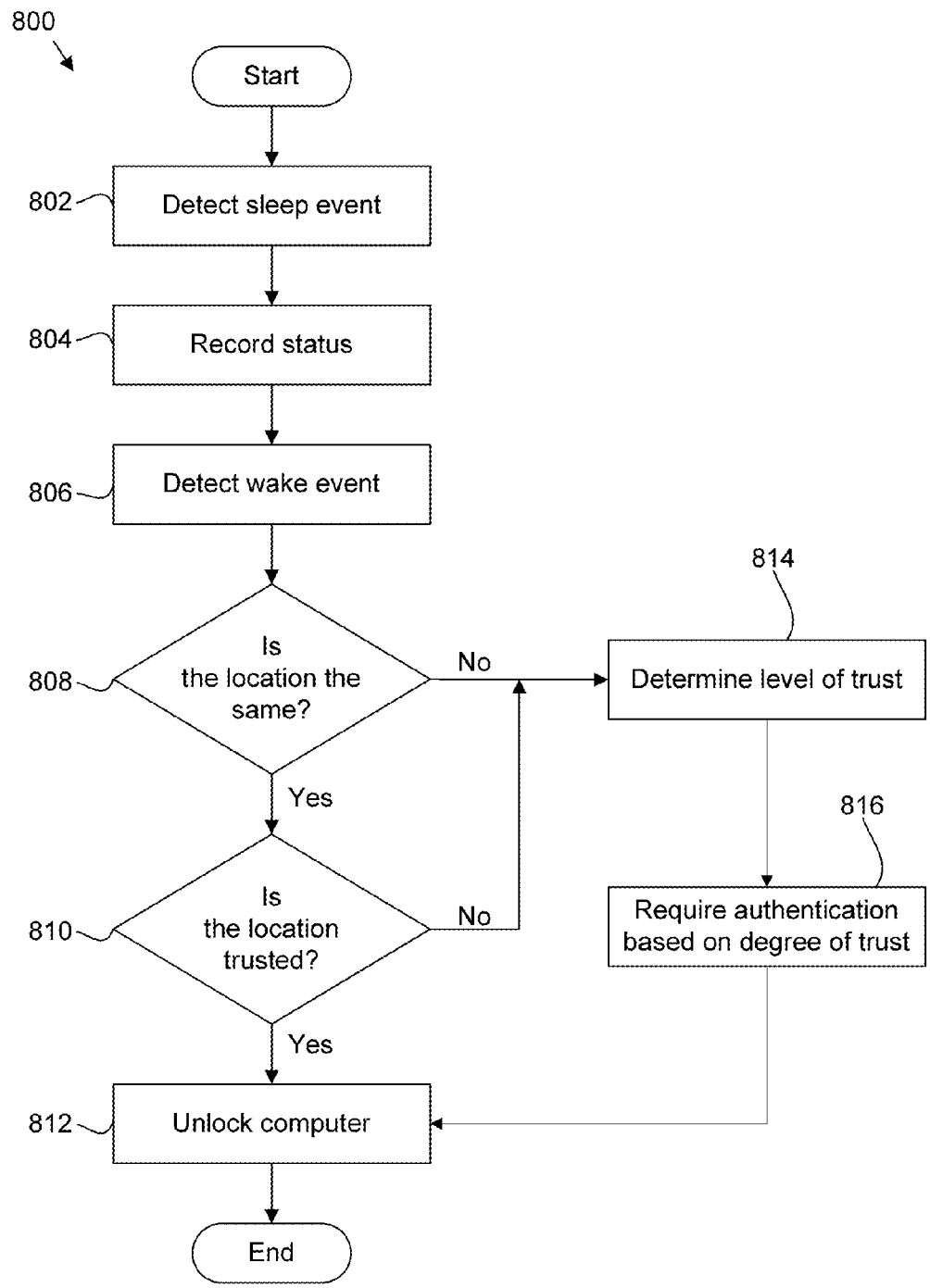
FIG. 8 is a schematic flow chart diagram illustrating another embodiment of a method for location based authentication including levels of trust.

FIG. 8 is a schematic flow chart diagram illustrating another embodiment of a method 800 for location based authentication including levels of trust. The method 800 starts, and similar to the method 600 of FIG. 6, the operating status module 305 of FIG. 3 detects 802 a sleep event. In one embodiment, detecting 802 a sleep event includes detecting an operating status change from a working state to a sleeping, hibernating, or equivalent low-powered state.

The security status module 308, of FIG. 3, then records 804 the security status of the device. In other words, the security status module 308 records whether the device was in a locked or an unlocked state at the moment the device began to transition to a sleep state. Simultaneously, the location module 302 records 804 the location of the device and the location history module 304 records the location. In one embodiment, the location module 302 uses any of the above described locating methods to determine the location of the device. These methods may include gps locating, cell tower positioning, WiFi positioning, IP geolocation, etc.

The operating status module 306 then detects a wake event 806. Or, stated differently, the user wakes the device by, for example, opening the lid of a notebook, pressing a power button, etc. The access control module 300 then determines if the location when the device wakes is the same 808 as when the device went to sleep by comparing the current location with the most recent location stored in the location history module 304.

If the location is the same 808, the access control module 300 then determines 810 if the location is trusted. In one embodiment, the access control module determines 810 if the location is trusted by communicating with the profile module 400 of FIG. 4 and retrieving the location settings 402 of the current location. If the location is trusted, the access control module 300 unlocks the device without authentication input from the user.

However, if the location is different 808, or the location is not trusted 810, then the access control module 300 determines 814 the level of trust of the location. Determining 814 the level of trust, in one embodiment, includes retrieving location settings from the profile module. Specifically, the trust level module 406 of FIG. 4 communicates the level of trust of the location with the access control module 300 of FIG. 3. The trust level module 406 may indicate that only one form of user-verification is required, or alternatively, multiple forms of user-verification are required. For example, if the device is located in an unexpected location, possibly indicating the device has been stolen, the trust level module 406 will indicate that a password together with other forms of biometric identification are required. As such, the access control module 300 will require 816 user-verification input based on the level of trust. Authentication input from the user, in one embodiment, may include one or more of inputting a password, swiping a fingerprint, or identifying the user based on other biometric information as described above. The access control module then unlocks 812 the device.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a memory having code stored therein;
   a processor which is coupled to the memory and which executes the code stored in
      the memory, the code executed by the processor being effective in:
      an operating status module identifying a change in an operating status of a device and maintaining a history of operating statuses;

a profile module maintaining a trust indicator for each operating status; and an access control module comparing a current operating status with a previous operating status from the history of operating statuses prior to the change that determines a level of authentication required to unlock the device in response to the trust indicator associated with the current operating status and the comparison with the previous operating status.

2. The apparatus of claim 1, wherein the access control module unlocks the device without requiring user authentication in response to the current operating status and the previous operating status comprising a second most recent operating status being the same, together with the trust indicator identifying the current operating status as trusted.

3. The apparatus of claim 1, wherein the operating status is a power state of the device, the power state selected from the group consisting of a sleep state, a hibernating state, a working state, and a powered off state.

4. The apparatus of claim 1, wherein the operating status is a location of the device, the location selected from the group consisting of geographic locations, and network locations.

5. The apparatus of claim 4, further comprising: a location module identifying a current location of the device; and wherein the access control module unlocks the device without requiring user authentication in response to the current location and a most recent previously identified location being the same.

6. The apparatus of claim 1, wherein the operating status is an operating mode of the device selected from the group consisting of a high-powered processor mode, a low-powered processor mode, a hardware machine mode, a virtual machine mode, and a remote machine mode.

7. The apparatus of claim 6, wherein the access control module unlocks a current operating mode in response to a security status of a previous operating mode.

8. A method comprising:
identifying a change in an operating status of a device and maintaining a history of operating statuses;
comparing a current operating status with a previous operating status from the history of operating statuses prior to the change;
maintaining a trust indicator for each operating status; and
determining a level of authentication required to unlock the device in response to the trust indicator associated with the current operating status and the comparison with the previous operating status.

9. The method of claim 8, further comprising unlocking the device without requiring user authentication in response to the current operating status and the previous operating status comprising a second most recent operating status being the same, together with the trust indicator identifying the current operating status as trusted.

10. The method of claim 8, wherein the operating status is a power state of the device, the power state selected from the group consisting of a sleep state, a hibernating state, a working state, and a powered off state.

11. The method of claim 8, wherein the operating status is a location of the device, the location selected from the group consisting of geographic locations, and network locations.

12. The method of claim 11, further comprising: identifying a current location of the device; and unlocking the device without requiring user authentication in response to the current location and a most recent previously identified location being the same.

13. The method of claim 8, wherein the operating status is an operating mode of the device selected from the group consisting of a high-powered processor mode, a low-powered processor mode, a hardware machine mode, a virtual machine mode, and a remote machine mode.

14. The method of claim 13, further comprising unlocking a current operating mode in response to a security status of a previous operating mode.

15. A computer program product comprising a non-transitory computer readable medium storing computer usable program code executable to perform operations comprising:
identifying a change in an operating status of a device and maintaining a history of operating statuses;
comparing a current operating status with a previous operating status from the history of operating statuses prior to the change;
maintaining a trust indicator for each operating status; and
determining a level of authentication required to unlock the device in response to the trust indicator associated with the current operating status and the comparison with the previous operating status.

16. The computer program product of claim 15, further comprising unlocking the device without requiring user authentication in response to the current operating status and the previous operating status comprising a second most recent operating status being the same, together with the trust indicator identifying the current operating status as trusted.

17. The computer program product of claim 15, wherein the operating status is a power state of the device, the power state selected from the group consisting of a sleep state, a hibernating state, a working state, and a powered off state.

18. The computer program product of claim 15, wherein the operating status is a location of the device, the location selected from the group consisting of geographic locations, and network locations.

19. The computer program product of claim 18, further comprising: identifying a current location of the device; and unlocking the device without requiring user authentication in response to the current location and a most recent previously identified location being the same.

20. The computer program product of claim 15, wherein the operating status is an operating mode of the device selected from the group consisting of a high-powered processor mode, a low-powered processor mode, a hardware machine mode, a virtual machine mode, and a remote machine mode.

* * * * *